United States Patent
Kalogeropulos et al.

(10) Patent No.: US 8,479,185 B2
(45) Date of Patent: Jul. 2, 2013

(54) METHOD AND SYSTEM FOR UTILIZING PARALLELISM ACROSS LOOPS

(75) Inventors: Spiros Kalogeropulos, Los Gatos, CA (US); Partha P. Tirumalai, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 12/963,786

(22) Filed: Dec. 9, 2010

(65) Prior Publication Data

US 2012/0151463 A1    Jun. 14, 2012

(51) Int. Cl.
*G06F 9/45* (2006.01)

(52) U.S. Cl.
USPC ............................................. 717/160

(58) Field of Classification Search
USPC ............................................. 717/160
See application file for complete search history.

(56) References Cited

U.S. PATENT DOCUMENTS

| | | | | |
|---|---|---|---|---|
| 5,093,916 A * | 3/1992 | Karp et al. | ............... | 719/331 |
| 5,337,395 A * | 8/1994 | Vassiliadis et al. | ............... | 706/42 |
| 6,438,747 B1 * | 8/2002 | Schreiber et al. | ............... | 717/160 |
| 6,530,079 B1 * | 3/2003 | Choi et al. | ............... | 717/158 |
| 8,060,857 B2 * | 11/2011 | Biggerstaff | ............... | 717/106 |
| 2006/0174237 A1 * | 8/2006 | Granston et al. | ............... | 717/161 |
| 2007/0169059 A1 * | 7/2007 | Halambi et al. | ............... | 717/160 |
| 2007/0234326 A1 * | 10/2007 | Kejariwal et al. | ............... | 717/151 |
| 2008/0229298 A1 * | 9/2008 | O'Brien et al. | ............... | 717/160 |
| 2009/0077545 A1 * | 3/2009 | Silvera et al. | ............... | 717/160 |
| 2009/0113404 A1 * | 4/2009 | Takayama et al. | ............... | 717/149 |
| 2009/0217253 A1 * | 8/2009 | Song et al. | ............... | 717/161 |
| 2009/0235237 A1 * | 9/2009 | Song et al. | ............... | 717/132 |
| 2010/0269102 A1 * | 10/2010 | Latorre et al. | ............... | 717/130 |
| 2011/0067014 A1 * | 3/2011 | Song et al. | ............... | 717/149 |
| 2011/0113224 A1 * | 5/2011 | Isshiki et al. | ............... | 712/240 |

OTHER PUBLICATIONS

Kejariwal et al., An Efficient Approach for Self-Scheduling Parallel Loops on Multiprogrammed Parallel Computers, LCPC (2005).*

* cited by examiner

*Primary Examiner* — Don Wong
*Assistant Examiner* — Theodore Hebert
(74) *Attorney, Agent, or Firm* — Osha Liang LLP

(57) ABSTRACT

A method for compiling application source code that includes selecting multiple loops for parallelization. The multiple loops include a first loop and a second loop. The method further includes partitioning the first loop into a first set of chunks, partitioning the second loop into a second set of chunks, and calculating data dependencies between the first set of chunks and the second set of chunks. A first chunk of the second set of chunks is dependent on a first chunk of the first set of chunks. The method further includes inserting, into the first loop and prior to completing compilation, a precedent synchronization instruction for execution when execution of the first chunk of the first set of chunks completes, and completing the compilation of the application source code to create an application compiled code.

20 Claims, 11 Drawing Sheets

310 — Table of Loop Dependencies

| Loop | Dependencies |
|---|---|
| Loop L1 | • Chunks in Loop L1 are dependent on prior chunks of Loop L1 |
| Loop L2 | • Chunks in Loop L2 are dependent on prior chunks of Loop L2<br>• Chunks in Loop L2 are dependent on chunks of Loop L1 as follows: Chunks $L2_{1-40}$ are dependent on Chunk $L1_1$, Chunks $L2_{41-80}$ are dependent on Chunk $L1_2$, Chunks $L2_{81-120}$ are dependent on Chunk $L1_3$, etc. |
| Loop L3 | • Chunks in Loop L3 are dependent on the first 2 chunks of Loop L1 |

312 Row 1
314 Row 2
316 Row 3

FIG. 6B

360 — Table of Loop Dependencies

| Loop | Dependencies |
|---|---|
| Loop L1 | • Chunks in Loop L1 are dependent on prior chunks of Loop L1 |
| Loop L2 | • Chunks in Loop L2 are dependent on prior chunks of Loop L2<br>• Chunks in Loop L2 are dependent on chunks of Loop L1 as follows: Chunks $L2_1$ is dependent on Chunk $L1_1$, Chunks $L2_2$ is dependent on Chunk $L1_2$, Chunks $L2_3$ is dependent on Chunk $L1_3$, etc. |
| Loop L3 | • Chunks in Loop L3 are dependent on prior chunks of Loop L3<br>• Chunks in Loop L3 are dependent on chunks of Loop L1 as follows: Chunks $L3_1$ is dependent on Chunk $L1_1$, Chunks $L3_2$ is dependent on Chunk $L1_2$, Chunks $L3_3$ is dependent on Chunk $L1_3$, etc. |

362 Row 1
364 Row 2
366 Row 3

*FIG. 7B*

METHOD AND SYSTEM FOR UTILIZING PARALLELISM ACROSS LOOPS

BACKGROUND

A typical multi-processor computer system includes the capability to execute multiple instructions at the same time. Specifically, the multi-processor computer system includes multiple interconnected processors (e.g., multiple processing cores and/or central processing units). Accordingly, applications, which execute in parallel on the distributed computer system, are able to exploit the processing power provided by interconnection of the processors. For example, by combining the processing power provided by the multiple interconnected processors, a given computation may be executed much faster by splitting the computation into multiple segments and executing each segment of the application in parallel rather than executing the application serially on a single processor.

Executing an application across several processors typically involves determining which portions of the application must be performed serially and which portions of an application may be performed in parallel (i.e., the portion that is safe to be performed in parallel). A portion of the application is deemed parallelizable if the portion may be divided into discrete segments such that each segment in the discrete segments may be executed by an individual thread simultaneously. In contrast, portions of the application that when parallelized would result in many thread interdependencies (i.e., data dependencies between threads), such as multiple reads and writes to the same memory space by different threads, are not typically parallelized.

One method of parallelizing an application is for a programmer or compiler to analyze the application and determine how to parallelize an application. For example, the programmer may analyze a single loop in the application to determine whether there are potential data dependencies between loop iterations within the single loop of the application. Once the programmer has determined how to parallelize the single loop, the programmer may add in specific instructions to the application for parallelizing the single loop in the application. Thus, iterations of the same loop may execute on different processors simultaneously.

SUMMARY

In general, in one aspect, the invention relates to a method for compiling application source code. The method includes selecting multiple loops for parallelization. The multiple loops include a first loop and a second loop. The method further includes partitioning the first loop into a first set of chunks, partitioning the second loop into a second set of chunks, and calculating data dependencies between the first set of chunks and the second set of chunks. A first chunk of the second set of chunks is dependent on a first chunk of the first set of chunks. The method further includes inserting, into the first loop and prior to completing compilation, a precedent synchronization instruction for execution when execution of the first chunk of the first set of chunks completes, and completing the compilation of the application source code to create an application compiled code.

In general, in one aspect, the invention relates to a computer system for executing compiled application code. The computer system includes memory configured to store compiled application code. The compiled application code includes a first loop that includes a first set of chunks and a second loop that includes a second set of chunks. The computer system further includes a multiple threads configured to execute on multiple processors. The multiple threads include a first thread and a second thread. The first thread is configured to execute a first chunk of the first set of chunks, set, based on completing execution of the first chunk, a synchronization variable after completing execution of the first chunk of the first set of chunks, and execute a first chunk of the second set chunks after setting the synchronization variable. The second thread is configured to wait until the synchronization variable is set, and execute a second chunk of the first set of chunks based on the synchronization variable being set.

In general, in one aspect, the invention relates to a non-transitory computer readable medium that includes computer readable program code embodied therein for causing a computer system to perform a method for compiling application source code. The method includes selecting multiple loops for parallelization. The multiple loops include a first loop and a second loop. The method further includes partitioning the first loop into a first set of chunks, partitioning the second loop into a second set of chunks, and calculating data dependencies between the first set of chunks and the second set of chunks. A first chunk of the second set of chunks is dependent on a first chunk of the first set of chunks. The method further includes inserting, into the first loop and prior to completing compilation, a precedent synchronization instruction for execution when execution of the first chunk of the first set of chunks completes, and completing the compilation of the application source code to create an application compiled code.

Other aspects of the invention will be apparent from the following description and the appended claims.

DETAILED DESCRIPTION

Figure 1:
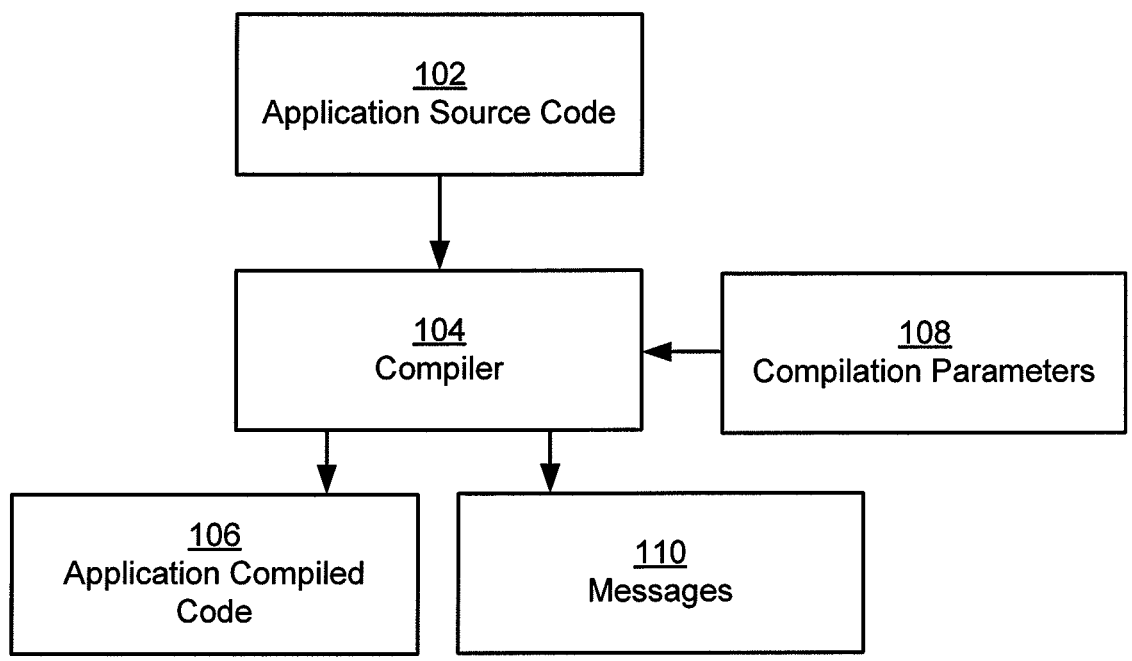
FIGS. 1-3 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Index values are used herein for examples and explanatory purposes. For example, loops may be referred to as Loop L1, Loop L2, Loop L3, where 1, 2, and 3 are index values. In one or more embodiments of the invention, when index values are used, the index values apply an ordering to that which the index value modifies unless otherwise specified. Thus, in the above example, Loop L1 precedes Loop L2, which precedes Loop L3. The aforementioned does not apply to reference characters used to refer to elements of the drawings. Further, the aforementioned does not apply to the use of the terms first, second, third, etc. in the claims. Specifically, the reference characters and claimed elements may or may not have the aforementioned ordering without departing from the scope of the invention.

In general, embodiments of the invention provide a method and system for executing multiple loops concurrently. The multiple loops may have dependencies between the loops as well as dependencies between iterations in the same loop. For example, consider the scenario in which two loops exist. One of the loops ("Loop A") may be dependent on the initial portion of the other loop ("Loop B") being executed. In such an example, once the initial portion of the other Loop B completes executing, the remaining portion of Loop B may execute concurrently with Loop A.

To execute the multiple loops, embodiments of the invention partition the multiple loops into chunks. A chunk is a grouping of multiple consecutive iterations of a loop. For each chunk, embodiments of the invention identify data dependencies affecting the chunk and insert synchronization instructions, if necessary, to synchronize based on the dependencies between chunks. For example, a chunk that must be executed before another chunk includes a synchronization instruction at the end of the chunk to signal the other chunk that execution completed. The other chunk includes a synchronization instruction to wait for the signal prior to executing. In one or more embodiments of the invention, the data dependencies and synchronization instructions are automatically inserted by a compiler.

Figure 2:
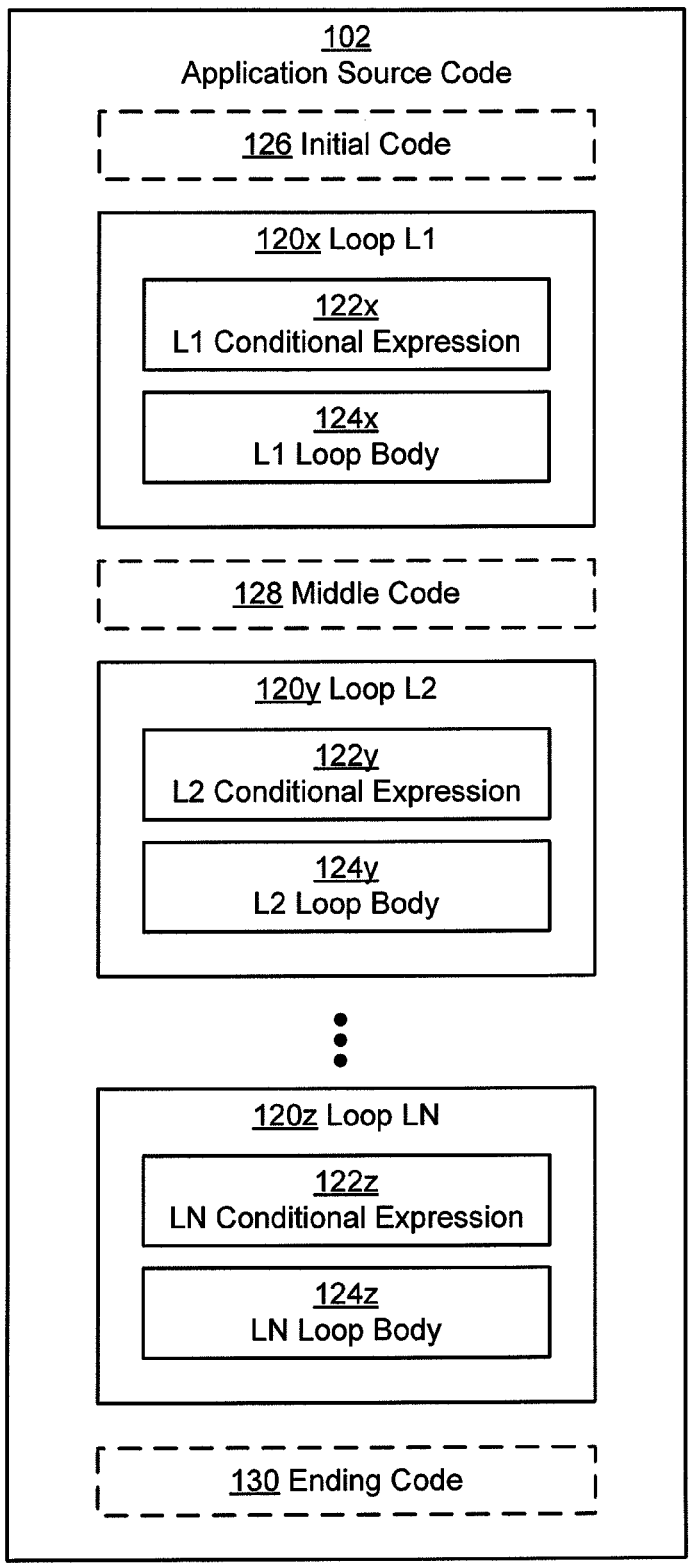
Figure 3:
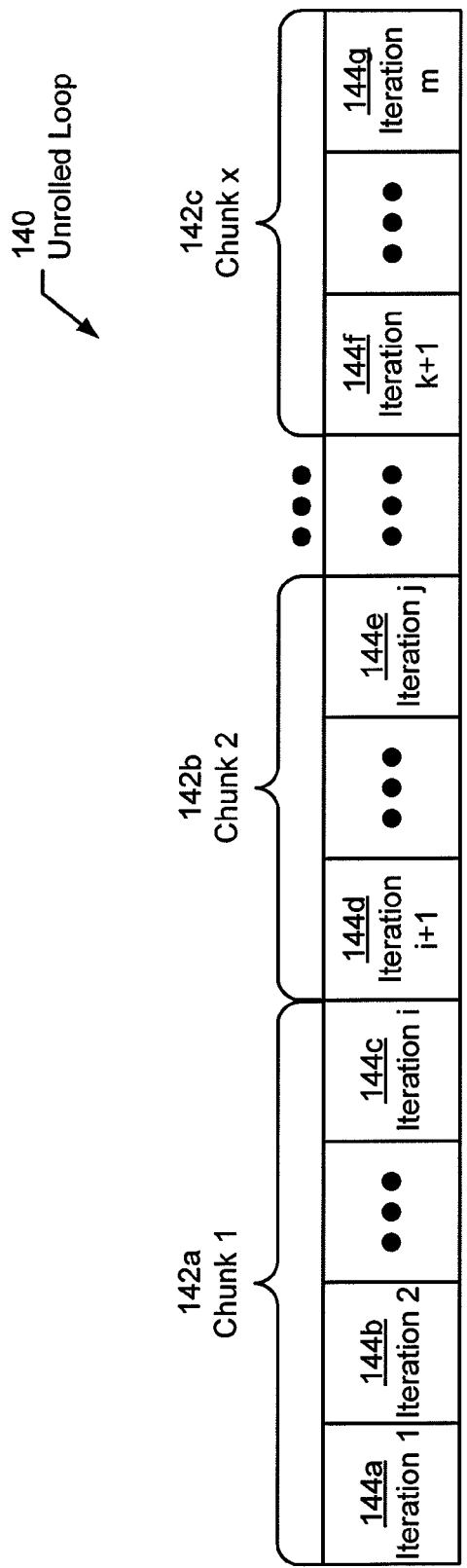

FIGS. 1-3 show schematic diagrams in accordance with one or more embodiments of the invention. As shown in FIG. 1, the system includes application source code (102), a compiler (104), application compiled code (106), compilation parameters (108), and messages (110). Each of these components are described below.

In one or more embodiments of the invention, application source code (102) is a collection of instructions that defines the application. In one or more embodiments of the invention, the application source code (102) is written in any high-level programming language, such as JAVA™, C, C++, Fortran, High Performance C, High Performance Fortran, etc. (JAVA™ is a trademark of Oracle International Corporation located in Redwood City, Calif.). Specifically, the application source code (102) corresponds to an application or part of an application written by an automatic code generator and/or, at least in part, by a developer. The application source code is discussed in more detail in FIG. 2.

Turning to FIG. 2, FIG. 2 shows a conceptual schematic diagram of application source code (102) in accordance with one or more embodiments of the invention. As shown in FIG. 2, the application source code (102) includes a collection of loops (e.g., Loops L1-LN (120$x$-$z$)). Each loop is a set of instructions that is specified once but may be performed multiple times in one or more embodiments of the invention. For example, the loops (e.g., Loops L1-LN (120$x$-$z$)) may be, for example, "for" loops, "do all" loops, "while" loops, "do while" loops, any other collection of repeating instructions, or any combination thereof.

Each loop (e.g., Loops L1-LN (120$x$-$z$)) includes a conditional expression (e.g., L1-LN conditional expressions (122$x$-$z$)) and a loop body (e.g., L1-LN Loop body (124$x$-$z$)) in one or more embodiments of the invention. The loop body (e.g., L1-LN Loop body (124$x$-$z$)) includes instructions that are executed during each iteration of the loop (e.g., Loops L1-LN (120$x$-$z$)). The conditional expression (e.g., L1-LN conditional expressions (122$x$-$z$)) controls whether to enter the loop and/or repeat the execution of the instructions in loop body (e.g., L1-LN Loop body (124$x$-$z$)). For example, the conditional expression (e.g., L1-LN conditional expressions (122$x$-$z$)) may be to perform the loop for a certain number of iterations or until a defined condition is reached.

In addition to loops (e.g., Loops L1-LN (120$x$-$z$)), the application source code (102) may optionally include initial code (126), middle code (128), and ending code (130). The initial code (126), middle code (128), and ending code (130) includes source code that is not included in the set of loops for parallelization. Specifically, initial code (126), middle code (128), and ending code (130) includes any source code that are not in the set of loops.

For example, the initial code (126) and/or ending code (130) may be include initialization instructions, instructions for other methods, or any other collection of instructions. Further, in one or more embodiments of the invention, the initial code (126) and/or ending code (130) may include another set of loops that are separately parallelized using one or more embodiments of the invention. Thus, the application source code (102) may include multiple sets of loops that are independently and separately parallelized using one or embodiments of the invention.

In some embodiments of the invention, sets of loops are not parallelizable if middle code (128) exists within the set of loops. In such embodiments, loops (e.g., Loops L1-LN (120$x$-$z$)) are required to be adjacent by the compiler (discussed below and in FIG. 1). In alternative embodiments of the invention, middle code (128) is restricted to code that is not in a dependency relationship with any of the loops after the middle code (128). In alternative embodiments of the invention, middle code (128) is treated as a single complete chunk when performing dependency analysis and parallelizing the set of loops. In such alternative embodiments, middle code (128) may have dependencies with loops (e.g., Loops L1-LN (120$x$-$z$)) before and after the middle code (128).

Continuing with the discussion of the loops, FIG. 3 shows a conceptual view of an unrolled loop (140) in one or more embodiments of the invention. In one or more embodiments of the invention, the loop is not actually unrolled in the application compiled code. Rather, the showing of the unrolled loop (140) in FIG. 3 of an unrolled loop is for explanatory purposes only. As shown in FIG. 3, a loop has multiple iterations (e.g., iterations 1-$m$ (144$a$-$g$)). Each iteration (e.g., iterations 1-$m$ (144$a$-$g$)) is a single execution of the loop body (discussed above and in FIG. 2).

Further, as shown in FIG. 3, in the unrolled loop, adjacent iterations of a loop may be grouped into chunks (e.g., Chunk 1-$x$ (142$a$-$c$)). The grouping of iterations in an unrolled loop (140) is referred to herein as partitioning the loop into chunks (e.g., Chunk 1-$x$ (142$a$-$c$)). Specifically, a chunk (e.g., Chunk 1-$x$ (142$a$-$c$)) is a collection of iterations (e.g., iterations 1-$m$ (144$a$-$g$)) that, even if the loop were executed serially, would be consecutively executed.

A chunk is dependent on another chunk in the same or different loop when one or more iterations of the chunk are dependent on one or more iterations of the other chunk. Specifically, a chunk is dependent on another chunk when both chunks include a memory operation to the same memory location, where at least one memory operation in one chunk is a write operation. In such a scenario, the chunk that would execute second, if the application were serially executed, is dependent on the chunk that would be executed first if the application were serially executed. A chunk that is dependent on another chunk is a "dependent chunk" with respect to the other chunk. Conversely, a chunk on which another chunk is dependent is a "precedent chunk" with respect to the other chunk.

Depending on the dependencies within the loop and with other loops, multiple chunks in the same loop may execute concurrently in one or more embodiments of the invention. In other words, the duration of time in which the instructions in two different chunks in execution overlap. However, in one or more embodiments of the invention, iterations (e.g., iterations 1-$m$ (144$a$-$g$)) are consecutively executed within a chunk (e.g., Chunk 1-$x$ (142$a$-$c$)). For example, in chunk 1 (142$a$), iteration 1 (144$a$) is executed prior to iteration 2 (144$b$) and so forth, while iteration i (144$c$) is executed last.

In one or more embodiments of the invention, the size of each chunk may be referred to as a chunk size. In one or more embodiments of the invention, the chunk size is defined as the number of iterations (e.g., iterations 1-$m$ (144$a$-$g$)) in a chunk (e.g., Chunk 1-$x$ (142$a$-$c$)). Alternatively or additionally, the chunk size may be defined as a unit of time. In one or more embodiments of the invention, each chunk has the same or approximately the same chunk size. However, if the total number of iterations (e.g., iterations 1-$m$ (144$a$-$g$)) in the loop is not divisible by the chunk size, then the last chunk may have the remaining number of iterations. In such a scenario, the last chunk may be of a different chunk size (e.g., have more or less number of iterations) than the other chunks in the loop.

Returning to the application source code (102) in FIG. 1, a compiler is configured to compile the application source code (102). Specifically, the compiler (104) includes functionality to use, as input, application source code (102) and generate, as output, application compiled code (106). Application compiled code (106) is a format of code, which can be understood by the computer at execution time in one or more embodiments of the invention. In one or more embodiments of the invention, the application compiled code (106) may be further compiled or interpreted at execution time. For example, application compiled code may correspond to object code, assembly code, byte code etc.

Continuing with the compiler (104) in FIG. 1, the compiler (104) includes functionality to identify sets of loops that may be performed in parallel and add synchronization instructions for parallelizing the set of loops. Specifically, the compiler includes functionality to identify data dependencies between iterations of the same and different loops, partition the loops into chunks, and insert synchronization instructions into the application compiled code according to the data dependencies.

In general, a synchronization instruction is an instruction used for signaling with another thread. Specifically, a thread that issues a signal executes a precedent synchronization instruction. A thread that receives the signal executes a dependent synchronization instruction. Despite the names, the synchronization instructions (i.e., precedent synchronization instruction and dependent synchronization instruction) may or may not execute at the same time. Specifically, when the dependent synchronization instruction is being executed, the thread that executed the corresponding precedent synchronization instruction may be executing other instructions of the application.

Different types of synchronization instructions may be used without departing from the scope of the invention. Specifically, the signaling between applications is based on the type of synchronization instruction being used.

In one or more embodiments of the invention, one type of synchronization instruction performs the signaling using a synchronization variable in shared memory. In such embodiments, the precedent synchronization instruction, when executed, sets, in shared memory, the synchronization variable corresponding to the dependency relationship. Setting the synchronization variable may be, for example, changing a value of the synchronization variable from "0" to "1" or from "1" to "0". The dependent synchronization instruction, when executed, checks the synchronization variable corresponding to the dependency relationship to determine whether the synchronization variable is set and issues a wait command if the synchronization variable is not set. In one or more embodiments of the invention, the dependent synchronization instruction may further include an instruction to reset the synchronization variable. Resetting the synchronization variable may be to change the synchronization variable to a preset initial value.

In one or more embodiments of the invention, another type of synchronization instructions performs signaling using message passing. In such embodiments, the precedent synchronization instruction, when executed, sends a message to the thread being signaled. The dependent synchronization instruction, when executed, waits for and receives the message.

Continuing with the compiler (104), the compiler (104) further includes functionality to perform the compilation according to compilation parameters (108). Compilation parameters (108) are a set of parameters that the compiler uses to compile the application source code (102). Specifically, the values of the compilation parameters may be obtained as default values, values provided by the programmer when instructing the compiler to compile, values within the application source code (102), or another set of values. In one or more embodiments of the invention, the compilation parameters (108) may include, but are not limited to, a parameters of the chunk size function, a threshold profitability level for parallelization, whether to parallelize a set of loops, and other parameters that may be used by a compiler.

In one or more embodiments of the invention, the chunk size function is a function use to calculate the chunk size. In one or more embodiments of the invention, all loops in the set of loops have the same chunk size. In such embodiments, the chunk size function is a function of the synchronization time, a synchronization multiplier, and combined value function for the estimated execution time. For example, the chunk size function may be chunk size=[(synchronization time*the synchronization multiplier)/the combined value function for the estimated execution time]. Each of the components of the chunk size function is discussed below.

The synchronization time is an amount of time for one thread to signal another thread that the chunk completed execution. In one or more embodiments of the invention, the synchronization time is dependent on the type of synchronization instruction used.

For example, consider the scenario in which the type of synchronization instruction is based on a synchronization variable in a shared memory location. In such an example, the synchronization time is the sum of the amount of time for the one thread to write a value of the synchronization variable to a shared memory location and the amount of time for another thread to read the value from the shared memory location. Thus, the synchronization time is dependent on the latency to access the shared memory location. For example, if thread 1 and thread 2 share the same cache, then the synchronization time is less than if thread 1 and thread 2 only share the same main memory because the latency to access the cache is less than the latency to access main memory.

By way of another example, consider the scenario in which the synchronization instruction is based on message passing. In such a scenario, the synchronization time is the sum of the time for one thread to generate and send a message, another thread to receive and process the message, and the transmission time.

Continuing with the chunk size function, the synchronization multiplier is a value that defines the ratio of time executing instructions of the loops to the synchronization time that is spent synchronizing. For example, a synchronization multiplier having a value of two means that twice the amount of time is to be spent executing instructions of the loop as compared to the synchronization time. As another example, a synchronization value of twenty-five means that twenty-five times the amount of synchronization time is to be spent executing instructions of the loop.

The combined value for the estimated execution time is a function to combine execution times to execute an iteration of each loop. For example, the combined value for the estimated execution time may be the minimum execution time over all loops to execute an iteration of the loop, an average execution time over all loops to execute an iteration of the loop, a maximum execution time over all loops to execute an iteration of the loop, or any other function for combining multiple values into a single value.

In alternative embodiments of the invention, the chunk size function is not the same for all loops. In such embodiments, the estimated execution time for an iteration of a loop may be used directly to calculate the chunk size for the loop. For example, the chunk size function may be chunk size for loop j=[(synchronization time*the synchronization multiplier)/estimated execution time of an iteration in loop j].

Further, although the above shows one chunk size function, alternative functions or methods for identifying the chunk size may be used. For example, rather than using a chunk size function, the chunk size may be a configurable parameter in the compilation parameters (108). Specifically, the chunk size may be a constant value that is provided to the compiler to compile the application source code (106).

Continuing with the compilation parameters (108), the threshold profitability level may define an acceptable minimum threshold amount of time that is saved by parallelization of a set of loops. Specifically, if the estimated amount of time saved by the parallelization is less than acceptable minimum threshold amount of time, then parallelization of the set of loops is not performed. Otherwise, parallelization by executing multiple loops in parallel may be performed.

In one or more embodiments of the invention, the amount of time that is saved by parallelization is the estimated execution with parallelization across multiple loops subtracted from the original execution time. For example, the original execution time to execute the loops is estimated as the sum of amount of time to execute the loops serially. The original execution time may account for other forms of parallelization (e.g., executing only iterations of a same single loop in parallel) or performing other operations.

In one or more embodiments of the invention, the estimated execution time for executing the set of loops in parallel is dependent on the synchronization time, the number of threads, and the number of iterations. The following equation may be used, for example, when the synchronization time is minimal, the amount of time for each chunk is approximately equal, and the dependency relationship follows the pattern that the first chunk of each loop is dependent on the first chunk of the prior loop, the second chunk of each loop is dependent on the second chunk of the prior loop, etc: parallel execution time=((M−1)*Chunk Execution Time)+((N*y*Chunk Execution Time/M), where M is the number of threads, N is the number of chunks of each loop, y is the number of iterations of each loop.

Returning to the compiler (104), in addition to application compiled code (106), the compiler (104) may include functionality to generate messages (110). A message (110) is information that is presented or stored regarding the compilation. For example, the messages (110) may include debug messages, error messages, optimization messages, or any other output of the compiler (104) that is not the application compiled code (106). For example, a message may include the profitability level for executing sets of loops in parallel, the number of sets of loops that are set to execute in parallel, and any other information.

Figure 4:
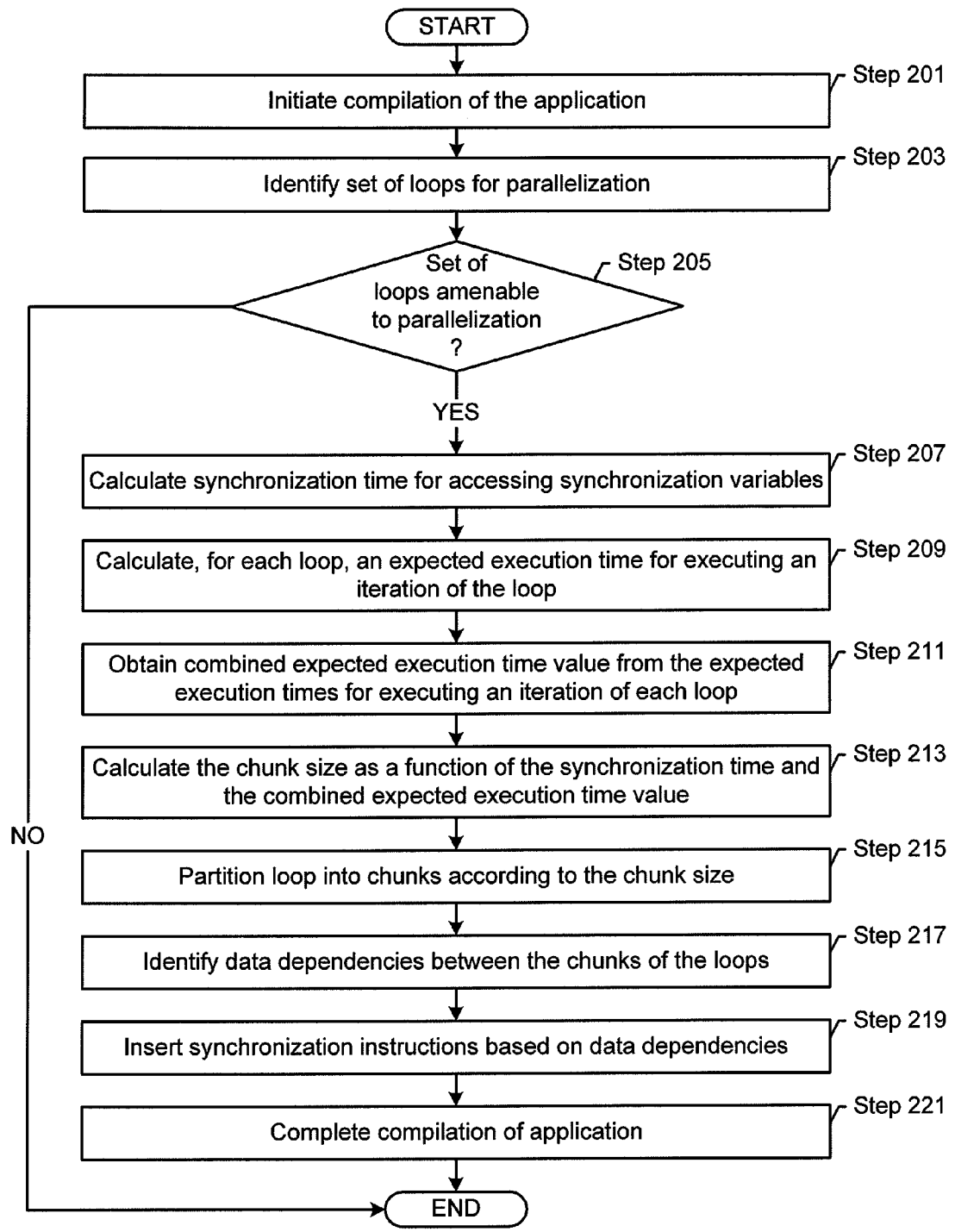
FIGS. 4 and 5 show flowcharts in accordance with one or more embodiments of the invention.
Figure 5:
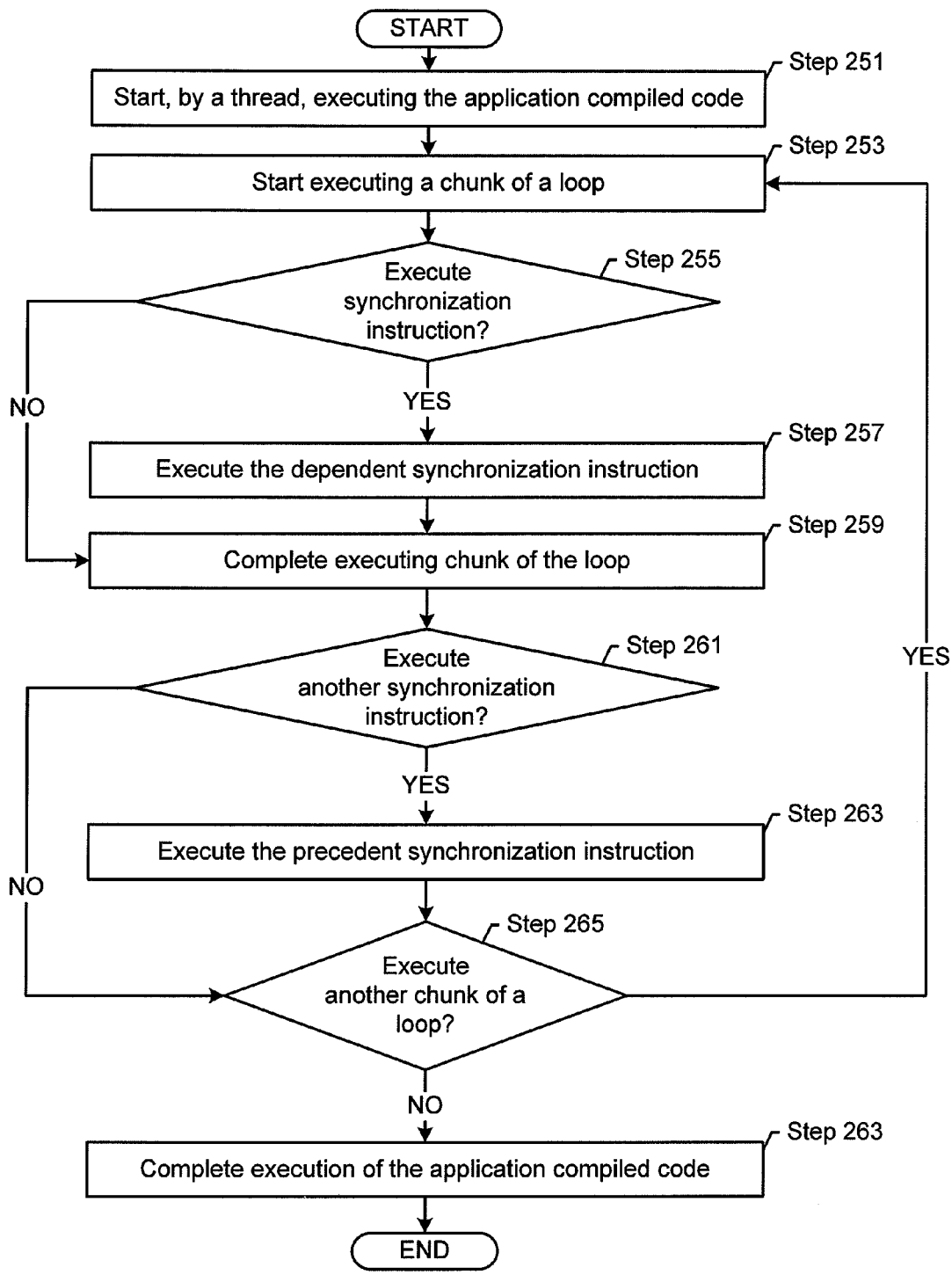

FIGS. 4 and 5 show flowcharts in accordance with one or more embodiments of the invention. While the various steps in these flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction in accordance with one or more embodiments of the invention. As another example, determination steps may be performed by performing a test, such as checking a data value to test whether the value is consistent with the tested condition in accordance with one or more embodiments of the invention.

FIG. 4 shows a flowchart for compiling an application having multiple loops for parallelization in accordance with one or more embodiments of the invention. In Step 201, compilation of the application is initiated in one or more embodiments of the invention. In one or more embodiments, an application developer may initiate compilation by providing the compiler with compilation parameters and a location of the application source code. In response, the compiler starts compiling the application source code. For example, the compiler may parse the application source code, perform any lexical analysis on the application source code, and/or perform any other compilation steps.

In Step 203, in the process of compiling the application source code, the compiler identifies a set of loops for parallelization in one or more embodiments of the invention. The set of loops may be automatically or manually identified. For example, an application developer may mark the set of loops as being a potential candidate for parallelization using a compiler command. As another example, during parsing or analysis of the application source code, the compiler may identify a set of two or more adjacent loops and identify the set as a set of loops for parallelization.

In Step 205, the compiler determines whether the set of loops are amenable to parallelization. Determining whether the set of loops are amenable to parallelization may include identifying the memory locations of memory accesses (e.g., read and write requests) in the set of loops, and performing a dependency analysis on the set of loops. Specifically, the compiler may determine whether all of the memory locations in all of the memory accesses are determinable (i.e., can be identified at compile time). If the memory locations are indeterminable, then the compiler excludes the loop having the indeterminable memory location and subsequent loops from the set of loops for parallelization. Subsequent loops are loops that would be executed after the loop having the indeterminable memory location if the loops were executed serially.

Continuing with the determining whether the set of loops are amenable to parallelization, the compiler may perform a dependency analysis on the set of loops. During the dependency analysis, the compiler uses the memory address in the memory operations to identify different iterations of the loops that reference the same memory location. If one of the memory operations is a write operation, then the compiler determines that a dependency exists. The compiler may then determine how the dependencies are aligned. For example, if initial iterations of a subsequent loop are dependent on the final iterations of a previous loop, then the compiler may remove the subsequent loop and loops subsequent to the subsequent loop from the set of loops for parallelization.

In the process of determining whether the set of loops are amenable to parallelization, the compiler may consider middle code in one or more embodiments of the invention. For example, the compiler may determine whether code between the loops in the set of loops can be parallelized with or is completely independent of the set of loops in one or more embodiments of the invention.

If the middle code is completely independent of the set of loops, then the middle code may be assigned to a particular thread and executed before, during or after the set of loops. If the middle code is dependent on previous loops in the set of loops and/or a subsequent loop, the middle code may be treated as a single separate chunk. In such a scenario, similar to chunks of the loop, the compiler may insert precedent and/or dependent synchronization instructions in the middle code. The compiler may further determine whether the set of loops with the middle code treated as a single separate chunk satisfies the profitability threshold.

The profitability level of parallelization with middle code is dependent on the dependency relationship between the middle code and previous loops. For example, if the compiler determines that the middle code is dependent on initial iterations of previous loops, then the compiler may determine that the middle code can be parallelized with the set of loops in one or more embodiments of the invention. If the compiler determines that the middle code is dependent on final iterations of the previous loops and subsequent loops are dependent on the middle code, then the compiler may exclude, from the set of loops, the middle code and subsequent loops to the middle code in one or more embodiments of the invention.

In alternative embodiments of the invention, the compiler may require that the loops are adjacent (i.e., without middle code) in the application source code. In one or more embodiments of the invention, how the compiler manages middle code may be configurable as a compilation parameter.

The above are only a few techniques or steps that the compiler may perform to determine whether the set of loops are amenable to parallelization. Other steps and techniques may be performed without departing from the scope of the invention.

In Step 207, the compiler calculates the synchronization time in one or more embodiments of the invention. As discussed above, the synchronization time is the latency for two different threads to access the same memory location. Accordingly, to calculate the synchronization time, the memory level that is shared between the processors executing the two threads in the memory hierarchy is identified. Based on the memory level, the compiler adds the latency to read to the memory level to the latency to write to the memory level. The total amount of time is the synchronization time. As an alternative, rather than the compiler calculating the synchronization time, the synchronization time may be provided to the compiler as a compilation parameter.

In Step 209, the compiler calculates, for each loop, an estimated execution time for executing an iteration of the loop in one or more embodiments of the invention. Specifically, for each loop the compiler calculates a separate estimated execution time in one or more embodiments of the invention. In one or more embodiments of the invention, the estimated execution time is dependent on the number and type of instructions in the loop body of the corresponding loop. The compiler may use a heuristic equation to calculate the estimated execution time. For example, the heuristic equation may be based on the number of instructions that the processor can process at a particular amount of time. Processing speed may be provided to the compiler as part of the compilation parameters. Alternatively, the compiler may be preconfigured with the processing speed of the particular processor or may use a general processing speed.

As part of Step 209, the compiler has calculated multiple estimated execution times, one for each loop in one or more embodiments of the invention. If the compiler uses the same chunk size for all loops, then in Step 211, the compiler obtains a combined estimated execution time value from the estimated execution times for executing an iteration of each loop in one or more embodiments of the invention. In one or more embodiments of the invention, the compiler generates the combined estimated execution time by mathematically combining the estimated execution time for executing an iteration of each loop. For example, as discussed above, with reference to FIG. 1, the compiler may calculate the average of the estimated execution times, the median of the estimated execution times, the minimum of the estimated execution times, the maximum of the estimated execution times, etc. of the estimated execution times in order to generate the combined estimated execution time.

In Step 213, the compiler calculates the chunk size as a function of the synchronization time and the combined estimated execution time value in one or more embodiments of the invention. In one or more embodiments of the invention, the chunk size is calculated by multiplying the synchronization time by the synchronization constant and dividing the result by the combined estimated execution time. In such embodiments, the chunk size is a number of iterations. Other functions may be used to calculate the chunk size without departing from the scope of the invention.

In Step 215, the compiler partitions each loop into chunks according to the chunk size in one or more embodiments of the invention. Partitioning a loop into chunks may include inserting instructions into the application to signal the end and beginning of each chunk. For example, an instruction may mark the end of a chunk by including an instruction in the loop body to test whether the current iteration is a multiple of the chunk size.

In Step 217, the compiler identifies data dependencies between the chunks of the loops in one or more embodiments of the invention. Specifically, the compiler performs a dependency analysis to identify dependencies between the chunks. The dependency analysis may use the dependency analysis discussed above with reference to Step 205. Specifically, the compiler may determine the dependencies between chunks of the same loop and chunks of different loops. Thus, the result of the dependency analysis, the compiler determines, for each chunk ("current chunk"), which chunks are dependent on the current chunk and which chunks are precedent on the current chunk.

In Step 219, the compiler inserts synchronization instructions based on the data dependencies in one or more embodiments of the invention. Specifically, for each chunk on which the current chunk is precedent, the compiler inserts a precedent synchronization instruction at the end of executing the current chunk in one or more embodiments of the invention. Conversely, for each chunk on which the current chunk is dependent, the compiler inserts a dependent synchronization instruction prior to executing the current chunk in one or more embodiments of the invention.

In embodiments in which the synchronization instructions use synchronization variables, each dependency relationship between chunks and executed by different threads may have a separate synchronization variable in shared memory. The separate synchronization variable may be grouped, for example, in an array or another such data structure. Alternatively or additionally, when a regular dependency pattern exists, each loop may have a single set of synchronization variables in one or more embodiments of the invention. Specifically, the same single set of synchronization variables may be used each time a chunk of the loop executes. In such a scenario, the compiler may insert a single set of precedent instructions and dependent instructions into the loop based on the dependency.

By way of an example, consider the scenario in which every chunk of loop 2 is dependent on prior chunks of loop 2 and on the corresponding chunk of loop 1 having the same index as the chunk in loop 2 (e.g., the first chunk in loop 2 is dependent on the first chunk in loop 1, the second chunk in loop 2 is dependent on the second chunk in loop 1, the third chunk in loop 2 is dependent on the third chunk in loop 1, and so forth). In such an example, the compiler may insert, into the code to check for the beginning of a chunk in loop 2, the following: (i) a dependent synchronization instruction to check whether a synchronization variable corresponding to the dependency relationship with the immediately preceding chunk of loop 2 is set; and (2) a dependent synchronization instruction to check whether a synchronization variable corresponding to the dependency relationship with the corresponding chunk of loop 1 is set.

In addition to the dependent synchronization instruction and the precedent synchronization instruction, the compiler includes functionality to insert instructions for the execution of multiple threads. The number of threads may be specified by the compilation parameters in one or more embodiments of the invention. For example, the compiler may be configured to spawn new threads and to assign chunks to particular threads. Different methods may be used to assign chunks to threads.

One method for assigning chunks to threads is to assign all chunks in a loop to a single thread. For example, thread 1 may be assigned to loop 1, thread 2 may be assigned to loop 2, thread 3 may be assigned to loop 3, etc.

Another method for assigning chunks to threads is to assign a chunk from each loop to a single thread in round robin in one or more embodiments of the invention. Specifically, when all threads are assigned to a set of chunks, then the steps repeat starting with the first thread. For example, consider the scenario in which three threads (T1, T2, T3) are being assigned to four loops (L1, L2, L3, L4) with each loop having ten chunks (C1-C10) to execute in parallel. In the example, in one or more embodiments of the invention, thread T1 is assigned to chunks C1, C4, C7, and C10 of loops L1-L4, thread T2 is assigned to chunks C2, C5, and C8 of loops L1-L4, and thread T3 is assigned to chunks C3, C6, and C9 of loops L1-L4. In the example, the compiler configures the application, such that each thread executes the chunks in the order that the chunks would execute. In the above example, thread T1 executes the chunks in the following order: C1 of L1, followed by C1 of L2, followed by C1 of L3, followed by C1 of L4, followed by C4 of L1, followed by C4 of L2, followed by C4 of L3, followed by C4 of L4, followed by C7 of L1, followed by C7 of L2, followed by C7 of L3, followed by C7 of L4, followed by C10 of L1, followed by C10 of L2, followed by C10 of L3, and then C10 of L4.

When assigning threads in a round robin to the chunks of the loops, the compiler may confirm that deadlock will not occur by the same thread being scheduled to execute a dependent chunk prior to executing the precedent chunk. By way of example, consider the example above where thread T1 is assigned to chunks C1, C4, C7, and C10 of loops L1-L4. In the example, the compiler may first confirm that chunk C1 of loop L4 is not dependent on chunk C4 of loop L1 because thread T1 executes C1 of L4 prior to executing C4 of L1.

Other methods may be used to assign chunks to threads without departing from the scope of the invention. Further, the method used may affect the synchronization instructions. Specifically, the compiler may exclude inserting synchronization instructions that correspond to the dependencies between chunks executed by the same thread.

By way of a first example, in embodiments where each thread is assigned to a separate loop, the compiler may exclude synchronization instructions based on dependencies within the same loop. In the first example, the compiler may only insert synchronization instructions based on dependencies between different loops.

By way of a second example, in embodiments in which each thread is assigned a chunk from each loop, the compiler may exclude inserting synchronization instructions for dependencies between chunks having the same index value between different loops. In the second example, the compiler may insert synchronization instructions based on dependencies within the same loop.

Continuing with FIG. 4, in Step 221, the compiler completes compilation of the application in one or more embodiments of the invention. While completing the compilation, the compiler may identify another set of loops for parallelization across the set of loops. In such a scenario, the compiler may repeat performing the steps of FIG. 4. In the process of compilation, the compiler may perform additional optimization techniques, such as identifying additional areas for parallelization in the code.

FIG. 5 shows a flowchart for executing the application in one or more embodiments of the invention. Specifically, FIG. 5 shows a flowchart from the perspective of a thread in one or more embodiments of the invention. Each thread of the application may independently perform the instructions of FIG. 5 in one or more embodiments of the invention. As used herein, a thread executes instructions when a processor executing the thread executes instructions assigned to the thread. From the perspective of the processor executing the thread, only a sequence of instructions that are assigned to the thread are being executed. Accordingly, the processor may not be actively aware of the steps being performed.

In Step 251, the thread starts executing the application compiled code.

While the thread is executing the application compiled code, the thread may start executing a chunk of a loop in Step 253.

In Step 255, a determination is made whether a synchronization instruction is executed in one or more embodiments of the invention. Specifically, when the thread starts executing a chunk, a dependent synchronization instruction may be a part of the initial instructions in the chunk. If such dependent synchronization instruction exists, then the thread executes the dependent synchronization instruction in Step 257. Executing the dependent synchronization instruction may include checking a synchronization variable specified by the dependent synchronization instruction to determine whether the synchronization variable is set. If the synchronization variable is not set, then the thread waits according to the dependent synchronization instruction. If the synchronization variable is set, then the thread may reset the dependent synchronization variable according to the dependent synchronization instruction.

Although FIG. 5 shows executing a single dependent synchronization instruction, Steps 255 and Step 257 may be repeated for each dependent synchronization instruction. Thus, even if one synchronization variable is set, the thread may wait until another synchronization variable is also set.

Continuing with FIG. 5, if a dependent synchronization instruction does not exist or after the thread completes executing the dependent synchronization instruction, the thread completes executing the chunk of the loop in Step 259 in one or more embodiments of the invention. Specifically, once the dependent synchronization instruction is executed, all precedent chunks to the current chunk have executed. Accordingly, the current chunk can start executing. If the dependent synchronization instruction does not exist, then the current chunk is not dependent on any chunk being executed by a different thread and can start executing anytime. Completing executing the chunk of the loop includes executing the iterations within the chunk in one or more embodiments of the invention.

In Step 261, a determination is made whether a synchronization instruction is executed in one or more embodiments of the invention. Specifically, when the thread completes executing a chunk, a precedent synchronization instruction may be a part of the last instructions in the chunk.

If such precedent synchronization instruction exists, then the thread executes the precedent synchronization instruction in Step 263. Specifically, executing the precedent synchronization instruction signals to other threads that the dependency is satisfied. Executing the precedent synchronization instruction may include setting a synchronization variable specified by the precedent synchronization instruction.

As discussed above, in some embodiments of the invention, the same synchronization variable may be set and reset multiple times. In such embodiments, prior to setting the synchronization variable, the synchronization variable may be checked to ensure that the synchronization variable is not already set. If the synchronization variable is already set, then the thread may wait until a dependent thread resets the synchronization variable.

In one or more embodiments of the invention, multiple dependent threads may be dependent on the same precedent thread. In such embodiments, the precedent thread may set a separate synchronization variable for each dependent thread. In other words, at least one separate synchronization variable exists for each pair of threads. Alternatively, in one or more embodiments of the invention, the precedent thread may set the synchronization variable to an integer value indicating the number of dependent threads. In such embodiments, each dependent thread resets the synchronization variable by decrementing the synchronization variable by one. After the next chunk is executed, the precedent thread may check to see if the synchronization variable is reset prior to setting the synchronization variable back to the integer value.

Although FIG. 5 shows executing a single precedent synchronization instruction, Steps 261 and Step 263 may be repeated for each dependent synchronization instruction. Thus, even if one synchronization variable is set, the thread may wait until another synchronization variable is also set.

In Step 265, a determination is made whether to execute another chunk of a loop in the set of loops. If a determination is made to execute another chunk, then the thread starts executing the next chunk of the loop in Step 253. Rather, than making an actual determination, the thread may simply continue executing instructions of the application, which includes executing another chunk.

If a determination is made not to execute another chunk, then the thread completes execution of the application compiled code in Step 263. Specifically, the thread continues executing the instructions in the application compiled code that are not in the set of parallelized loops. Continuing execution may include repeating Steps 253-365 for the next set of loops that are parallelized.

FIGS. 6A-7B show two examples in accordance with one or more embodiments of the invention. The following examples are for explanatory purposes only and not intended to limit the scope of the invention.

Figure 6A:
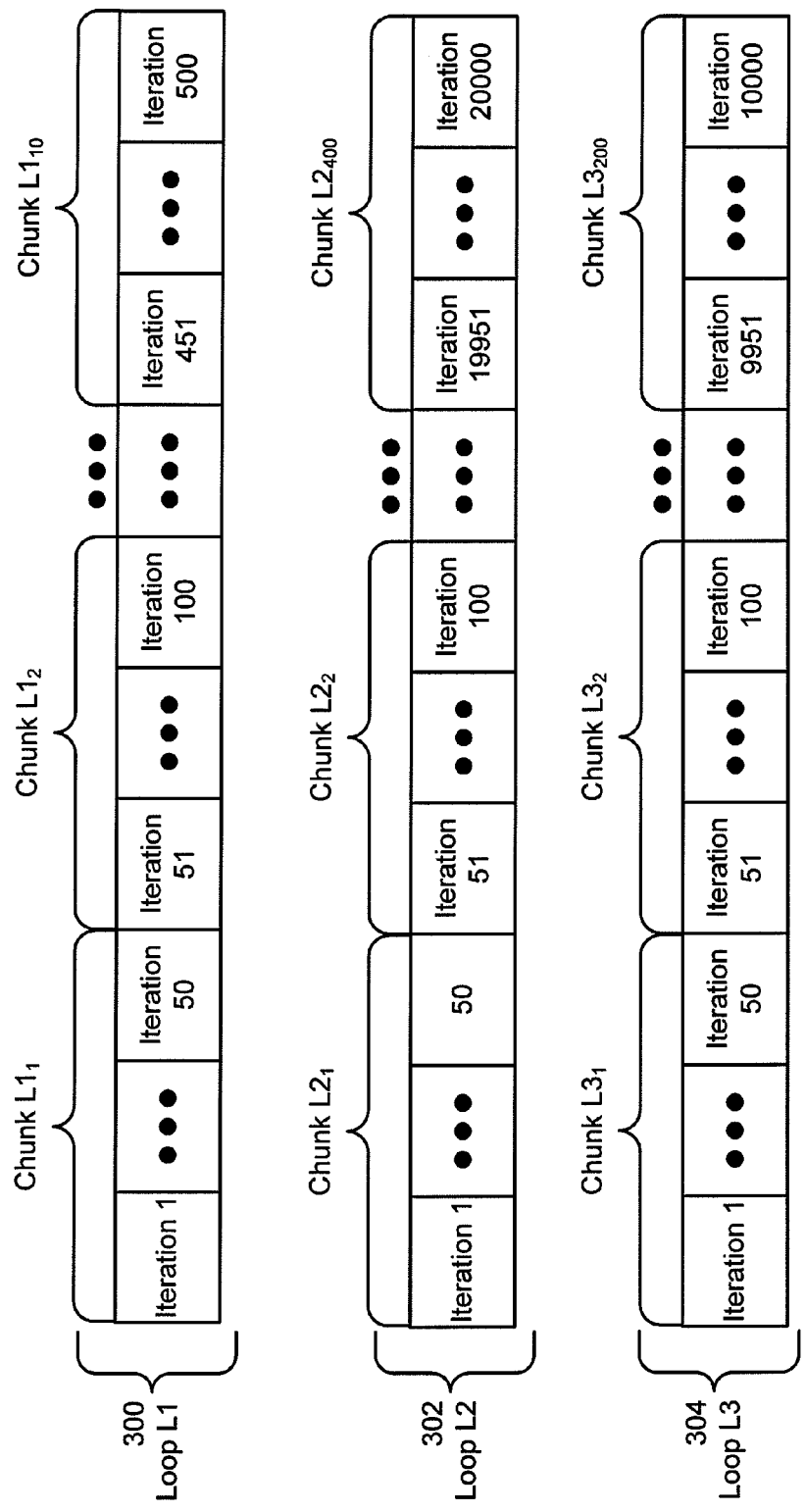
FIGS. 6A-7B show examples in accordance with one or more embodiments of the invention.
Figure 6C:
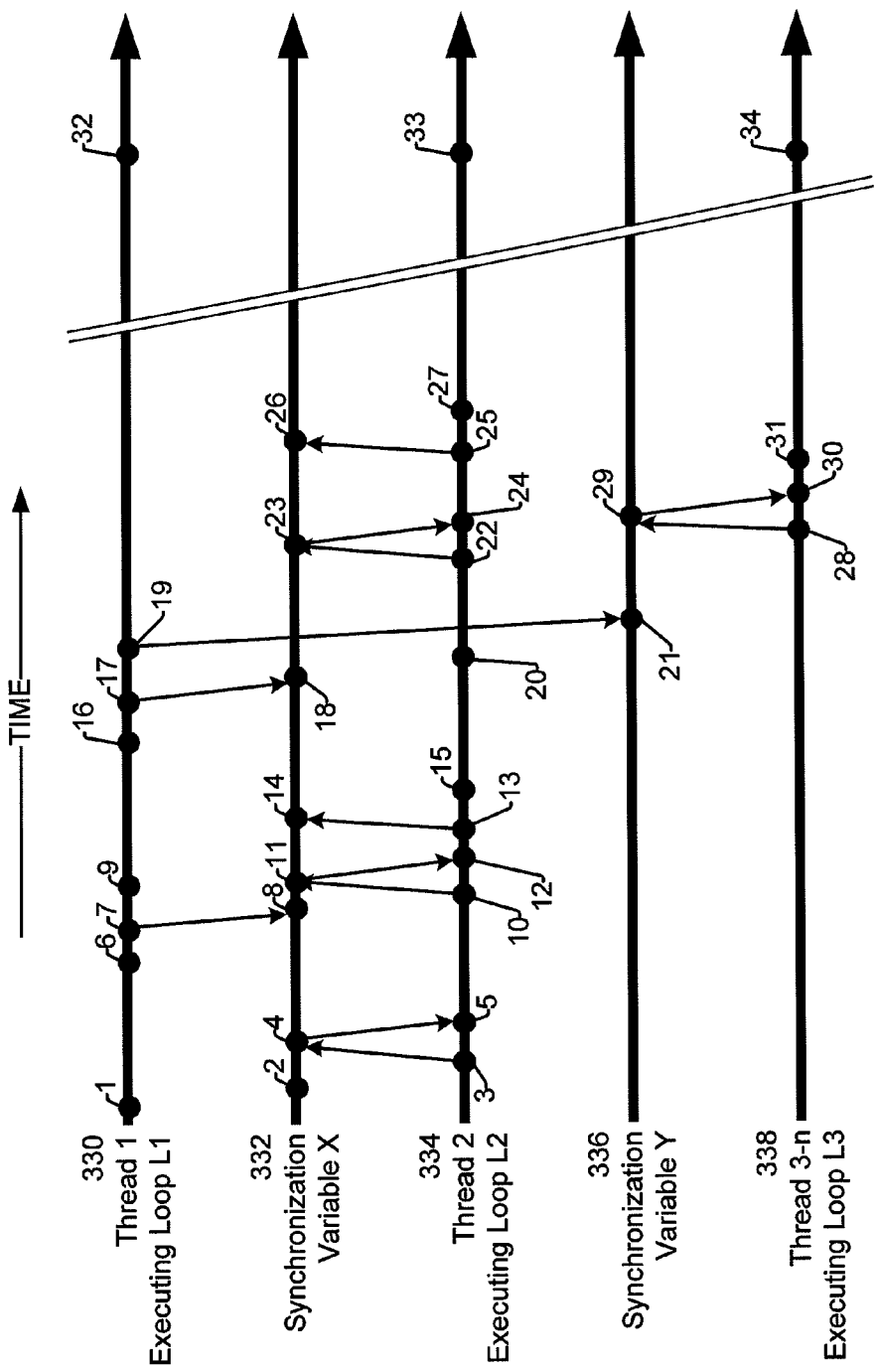

FIGS. 6A-6C shows a first example for executing multiple loops in parallel in accordance with one or more embodiments of the invention. FIG. 6A shows a conceptual view of the three unrolled loops (e.g., Loop L1 (300), Loop L2 (302), and Loop L3 (304)). As shown in the example, Loop L1 (300) has 500 iterations, Loop L2 (302) has 20000 iterations, and Loop L3 (304) has 10000 iterations. Each iteration of Loop L1 (300) has an estimated execution time of 21 clock cycles. Each iteration of Loop L2 (302) has an estimated execution time of 4 clock cycles. Each iteration of Loop L3 (304) has an estimated execution time of 5 clock cycles.

Further, for the example, consider the scenario in which each chunk is divided into the same number of iterations and the function used to create the combined estimated execution time uses the mean of the estimated execution time. Additionally, in the example, the synchronization time is 20 clock cycles and the synchronization multiplier is 25.

Using the above values, the combined estimated execution time value is (21+4+5)/3=10. Accordingly, using the above values, the chunk size may be calculated as 20*25/10=50 iterations. Thus, as shown in FIG. 6A, each loop is partitioned into chunks of size 50 iterations. Loop L1 (300) has 10 chunks (i.e., 500/50=10), Loop L2 (302) has 400 chunks (i.e., 20,000/50=400), and Loop L3 (304) has 200 chunks (i.e., 10,000/50=200).

Continuing with the first example, FIG. 6B shows a table of dependencies (310) between the loops. Specifically, after partitioning the loops into chunks, the compiler may analyze the dependencies between chunks to insert synchronization instructions. Each row (e.g., row 1 (312), row 2 (314), and row 3 (316)) in the table of dependencies (310) corresponds to a loop and shows how chunks of the loop are dependent on previous chunks in the same loop and/or different loops. As shown in row 1 (312) of FIG. 6B, chunks in Loop L1 are only dependent on prior chunks of Loop L1. As shown in row 2 (314) of FIG. 6B, chunks in Loop L2 are dependent on prior chunks of Loop L2, and chunks in L2 are dependent on Chunks in L1 as follows: Chunks $L2_{1-40}$ are dependent on Chunk $L1_1$, Chunks $L2_{41-80}$ are dependent on Chunk $L1_2$, Chunks $L2_{81-120}$ are dependent on Chunk $L1_3$, etc. In other words, chunks in Loop L2 are dependent in a 40 to 1 ratio to corresponding chunks in Loop L1. Continuing with the example, as shown in Row 3 (316), all chunks in Loop L3 are dependent only on the first two chunks of L1. Thus, as soon as the first two chunks of L1 execute, all chunks of L3 may execute.

In the first example, the compiler assigns Thread 1 to execute Loop L1, Thread 2 to execute Loop L2, and the remaining threads (i.e., Threads 3-$n$) to execute Loop L3. Based on the assignment, the compiler inserts a precedent synchronization instruction to set the value of synchronization variable X at the end of the loop body of Loop 1 to execute at the end of each chunk (i.e., every 50 iterations). Based on the assignment, the compiler also inserts a precedent synchronization instruction to set the value of synchronization variable Y at the end of the loop body of Loop 1 to execute at the end of executing the second chunk (i.e., at the end of 100 iterations). Because Loop L1 is being executed by a single thread, the compiler does not insert additional synchronization instructions into Loop L1 for the dependency between chunks of Loop L1 in one or more embodiments of the invention.

Continuing with the example, based on the assignment, the compiler inserts a dependent synchronization instruction, at the beginning of the loop body of Loop 2, to wait until the value of synchronization variable X is set. The compiler configures the dependent synchronization instruction to execute at the beginning of every 40 chunks (i.e., every 200 iterations). Further, the compiler inserts a dependent synchronization instruction to wait until the value of synchronization variable Y is set prior to executing any chunk of Loop L3.

Continuing with the example, after compiling the application source code to create the compiled application code, the compiled application code may be executed. FIG. 6C shows an example timing diagram showing how the compiled application code may be executed. In the example timing diagram, arrows between a synchronization variable and threads show where threads may access the synchronization variable to set or check the synchronization variable.

At (1), Thread 1 (330) starts executing chunks of Loop L1. At (2), Synchronization Variable X (332) is at the initial value of 0. Thus, when at (3), Thread 2 (334) checks the value of Synchronization Variable X (332), Synchronization Variable X (332) still has a value of 0 at (4). At (5), Thread 2 (334) continues to wait for Synchronization Variable X (332) to be set.

In the meantime, Thread 1 (330) continues to execute chunk $L1_1$. Thread 1 (330) completes execution at (6). At (7), based on completing chunk $L1_1$, Thread 1 (330) executes a precedent synchronization instruction to set the value of Synchronization Variable X (332) to 1. Accordingly, at (8), the value of Synchronization Variable X is 1. Further, at (9), Thread 1 (330) continues to execute Loop 1, by executing Chunk $L1_2$.

Returning to Thread 2 (334) in the example, at (10), Thread 2 (334) checks the value of the Synchronization Variable X (332). Because the value at (11) of the Synchronization Variable X (332) is 1, Thread 2 (332) receives the result of 1 at (12). At (13), Thread 2 (334) resets the value of the Synchronization Variable X (332) to 0. Accordingly, at (14) the value of Synchronization Variable X (332) is 0. At (15) Thread 2 (334) starts executing Chunks $L2_{1-40}$. Because Chunks $L2_{1-40}$ are not dependent on any other chunks, which have not executed, and are not precedent to any chunks, Chunks $L2_{1-40}$ execute without executing further synchronization instructions.

In the meantime, at (16), Thread 1 (330) completes executing Chunk $L1_2$ of Loop L1. Accordingly, because Loop L2 and Loop L3 are both dependent on Chunk $L1_2$, Thread 1 executes a precedent synchronization instruction at (17) to set the value of Synchronization Variable X (332) at (18), and executes a precedent synchronization instruction at (19) to set the value of Synchronization Variable Y (336) at (21).

Returning to Thread 2 (334) in the example, at (22), Thread 2 (334) checks the value of the Synchronization Variable X (332). Because the value at (23) of the Synchronization Variable X (332) is 1, Thread 2 (332) receives the result of 1 at (24). At (25), Thread 2 (334) resets the value of the Synchronization Variable X (332) to 0. Accordingly, at (26) the value of Synchronization Variable X (332) is back to 0. At (27), Thread 2 (334) starts executing Chunks $L2_{41-80}$. Because Chunks $L2_{41-80}$ are not dependent on any other chunks, which have not executed, and are not precedent to any chunks, Chunks $L2_{41-80}$ execute without executing synchronization instructions.

Continuing with the example, at the same time, Threads 3-n (338) can start executing Loop L3. At (28), Threads 3-n (338) check the value of the Synchronization Variable Y (336). Because the value at (29) of the Synchronization Variable Y (336) is 1, Threads 3-n (338) receive the result of 1 at (30). Because Threads 3-n (338) do not need to recheck the synchronization variable again, Threads 3-n (338) may not execute instructions to reset the value of the Synchronization Variable Y (336) to 0. At (31), Threads 3-n (338) start executing all Chunks of Loop L3 in parallel. Specifically, because the Chunks of Loop L3 are not interdependent, once any chunk in Loop L3 can execute, all Chunks in Loop L3 can execute.

At this stage, all threads are concurrently executing Loop L1, Loop L2, and

Loop L3 in parallel. Thread 1 (330) and Thread 2 (334) may continue executing synchronization instructions to update Synchronization Variable X (332). Thread 1 (330) completes executing Loop L1 at (32). Thread 2 (334) completes executing Loop L2 at (33). Thread 3 (338) completes executing Loop L3 at (34).

Although the example shows separate time steps for the checking and resetting of the synchronization variable, in one or more embodiments of the invention, the checking and resetting the value of the synchronization variable is atomically performed. Thus, another thread cannot write to the synchronization variable between time in which the synchronization variable is check and when it is reset. For example, between time (10) and time (13), thread 1 cannot write to the synchronization variable in one or more embodiments of the invention.

Figure 7A:
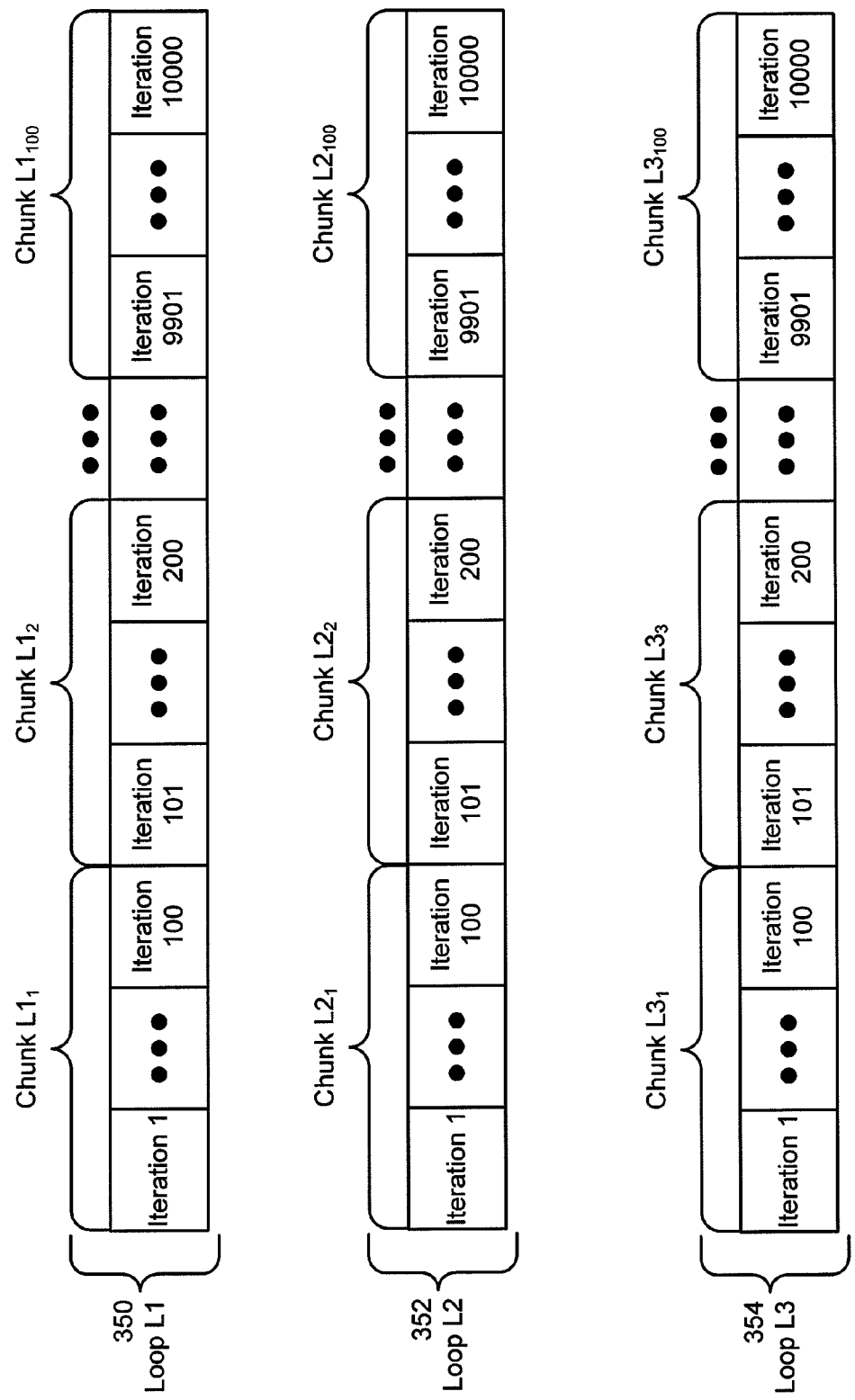

FIGS. 7A-7B show a second example for executing multiple loops in parallel in accordance with one or more embodiments of the invention. FIG. 7A shows a conceptual view of the three unrolled loops (e.g., Loop L1 (350), Loop L2 (352), and Loop L3 (354)). As shown in the second example, Loop L1 (350), Loop L2 (352), and Loop L3 (354) each have ten thousand iterations. Each iteration of Loop L1 (350) has an estimated execution time of 6 clock cycles. Each iteration of Loop L2 (352) has an estimated execution time of 3 clock cycles. Each iteration of Loop L3 (354) has an estimated execution time of 7 clock cycles.

Further, for the second example, consider the scenario in which each chunk is divided into the same number of iterations and the function used to create the combined estimated execution time is to use the minimum of the estimated execution time. Additionally, in the example, the synchronization time is 15 clock cycles and the synchronization multiplier is 20.

Using the above values, the combined estimated execution time value is 3 clock cycles (i.e., min[3, 7, 6]=3). Accordingly, using the above values, the chunk size may be calculated as 15*20/3=100 iterations. Thus, as shown in FIG. 7A, each loop is partitioned into chunks of size 100 iterations. Because Loop L1 (350), Loop L2 (352), and Loop L3 (354) each have the same number of iterations, all loops have 100 chunks.

Continuing with the second example, FIG. 7B shows a table of dependencies (360) between the loops. Specifically, after partitioning the loops into chunks, the compiler may analyze the dependencies between chunks to insert synchronization instructions. Similar to the first example, in the second example, each row (e.g., row 1 (362), row 2 (364), and row 3 (366)) in the table of dependencies (360) corresponds to a loop and shows how chunks of the loop are dependent on previous chunks in the same loop and/or different loops. As shown in row 1 (362) of FIG. 7B, chunks in Loop L1 are only dependent on prior chunks of Loop L1. As shown in row 2 (364) of FIG. 7B, chunks in Loop L2 are dependent on prior chunks of Loop L2, and on Chunks in L1 having the same index value. For example, Chunks $L2_1$ is dependent on Chunk $L1_1$, Chunks $L2_2$ is dependent on Chunk $L1_2$, Chunks $L2_3$ is dependent on Chunk $L1_3$, etc. In other words, chunks in Loop L2 are dependent in a 1 to 1 ratio to corresponding chunks in Loop L1. Continuing with the example, as shown in Row 3 (366), similar to Loop L2, chunks of Loop L3 are dependent on prior chunks of Loop L3, and on Chunks in L2 having the same index value.

In the second example, the compiler assigns each thread to execute a chunk of each loop in round robin. Specifically, for the second example, consider the scenario in which 10 threads are executing concurrently. Thus, in the second example, Thread 1 executes Chunk $L1_1$, Chunks $L2_1$, Chunk $L3_1$, Chunk $L1_{11}$, Chunks $L2_{11}$, Chunk $L3_{11}$, Chunk $L1_{21}$, Chunks $L2_{21}$, Chunk $L3_{21}$, Chunk $L1_{31}$, Chunks $L2_{31}$, Chunk $L3_{31}$, etc. Thread 2 executes Chunk $L1_2$, Chunks $L2_2$, Chunk $L3_2$, Chunk $L1_{12}$, Chunks $L2_{12}$, Chunk $L3_{12}$, Chunk $L1_{22}$, Chunks $L2_{22}$, Chunk $L3_{22}$, Chunk $L1_{32}$, Chunks $L2_{32}$, Chunk $L3_{32}$, etc. Thread 3 executes Chunk $L1_3$, Chunks $L2_3$, Chunk $L3_3$, Chunk $L1_{13}$, Chunks $L2_{13}$, Chunk $L3_{13}$, Chunk $L1_{23}$, Chunks $L2_{23}$, Chunk $L3_{23}$, Chunk $L1_{33}$, Chunks $L2_{33}$, Chunk $L3_{33}$, etc. The assignment similarly continues the pattern for remaining 7 threads.

Based on the assignment, the compiler inserts, into the loop body of each loop, a precedent synchronization instruction to set the value of a synchronization variable, and a dependent synchronization instruction to wait for the value of the same synchronization variable to be set execute. Specifically, the precedent synchronization instruction executes at the end of the executing of each chunk of the loop, except perhaps the last chunk. The dependent synchronization instruction executes at the beginning of the executing of each chunk of the loop, except the first chunk. Even though chunks in Loop L2 are dependent on chunks in Loop L1 with the same index, because of the assignment (i.e., a thread does not move to the dependent chunk unless it has executed the previous chunk), dependent and precedent synchronization instructions are not inserted to check for synchronization variables shared between loops. Rather, synchronization variables are only shared between chunks of the same loop in one or more embodiments of the invention.

The assignment shown in the second example creates load balancing amongst the threads. Specifically, each thread executes for the same number of clock cycles (i.e., (3+7+6)*100*10=16,000 clock cycles). Further, as shown with the first example and the second example, different assignments of threads to chunks may be performed, which changes which synchronization variables are used.

Regardless of the assignment, as shown by way of the above examples, embodiments of the invention provide a technique for configuring an application to execute multiple loops in parallel when dependencies exist between the multiple loops. Thus, loops that are in a dependency relationship with another loop may be executed concurrently with the other loop.

Figure 8:
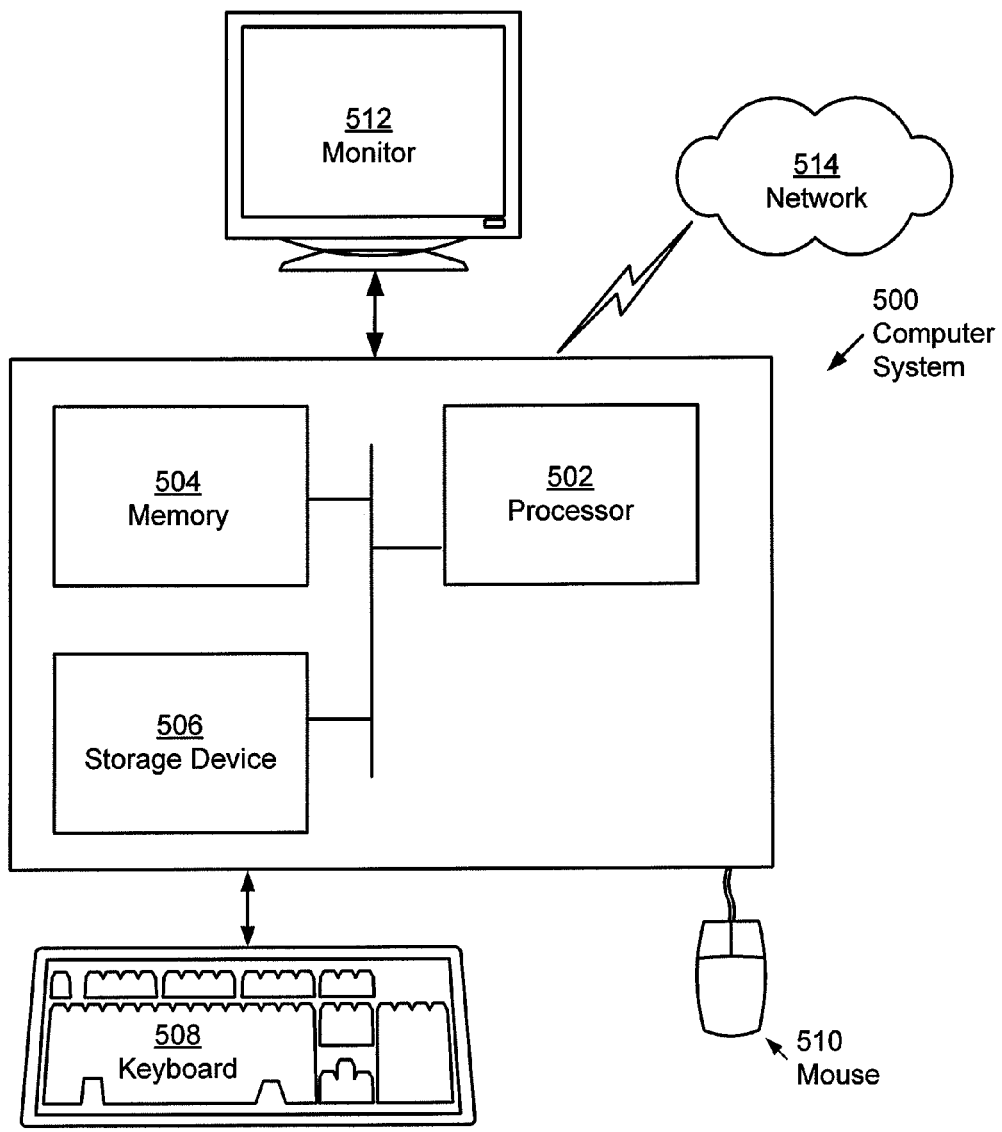
FIG. 8 shows a computer system in accordance with one or more embodiments of the invention.

Embodiments of the invention may be implemented on virtually any type of computer regardless of the platform being used. For example, as shown in FIG. 8, a computer system (500) includes one or more processor(s) (502) such as an integrated circuit, central processing unit (CPU), hardware processor, etc., associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The processors are hardware devices for executing instructions. For example, each processor may correspond to a central processing unit, a processing core on a central processing unit, a strand in a processor core of a central processing unit, or another type of hardware device for processing instructions.

The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., compiler, application source code, compilation parameters, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Computer readable program code to perform embodiments of the invention may be stored on a non-transitory computer readable storage medium such as a compact disc (CD), a diskette, a tape, physical memory, or any other non-transitory computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for compiling application source code, the method comprising:
    selecting a plurality of loops for parallelization, wherein the plurality of loops comprises a first loop and a second loop, wherein the plurality of loops are in a sequence;
    partitioning the first loop into a first plurality of chunks;
    partitioning the second loop into a second plurality of chunks;

calculating a plurality of data dependencies between the first plurality of chunks and the second plurality of chunks, wherein a first chunk of the second plurality of chunks is dependent on a first chunk of the first plurality of chunks;

inserting, into the first loop and prior to completing compilation, a precedent synchronization instruction for execution when execution of the first chunk of the first plurality of chunks completes;

completing the compilation of the application source code to create an application compiled code; and for each loop of the plurality of loops, assigning, for execution, a plurality of threads in round robin order to chunks of the loop, wherein the plurality of threads are assigned in a same order for each of the plurality of loops.

2. The method of claim 1, wherein during execution of the application compiled code, the plurality of loops are concurrently executed by a plurality of threads, wherein concurrently executing the plurality of loops comprises executing a second chunk of the first plurality of chunks while executing the first chunk of the second plurality of chunks.

3. The method of claim 1, wherein the precedent synchronization instruction, when executed, sets a synchronization variable.

4. The method of claim 3, wherein a second chunk of the first plurality of chunks is dependent on the first chunk of the first plurality of chunks, and wherein the method further comprises:

inserting, into the first loop, a dependent synchronization instruction for execution before execution of the first chunk of the first plurality of chunks, wherein the dependent synchronization instruction, when executed, waits for the synchronization variable to be set.

5. The method of claim 3, further comprising:

inserting, into the second loop, a dependent synchronization instruction for execution before execution of the first chunk of the second plurality of chunks completes, wherein the dependent synchronization instruction, when executed, waits for the synchronization variable to be set.

6. The method of claim 3, wherein partitioning the first loop into the first plurality of chunks comprises:

obtaining a synchronization time to synchronize based on a time for the thread to access the synchronization variable;

obtaining a synchronization multiplier; and calculating the chunk size by multiplying the synchronization time by the synchronization multiplier to obtain a first result, wherein each of the first plurality of chunks is of the chunk size.

7. The method of claim 6, wherein partitioning the first loop into the first plurality of chunks further comprises:

calculating an estimated execution time for executing an iteration of each loop of the plurality of loops;

generating a combined estimated execution time value by mathematically combining the estimated execution time for executing the iteration of each loop of the plurality of loops; and dividing the first result by the combined estimated execution time value to obtain a second result, wherein the second result is the chunk size.

8. The method of claim 1, further comprising:

determining whether all memory accesses in the set of loop are determinable, wherein the precedent instruction is inserted based on all memory accesses in the set of loops being determinable.

9. The method of claim 1, further comprises:

calculating a first estimated execution time to execute the plurality of loops in parallel; and calculating a second estimated execution time to execute the plurality of loops in serial, wherein the precedent instruction is inserted based on the first estimated execution time being less than the second estimated execution time.

10. A computer system for executing compiled application code, the computer system comprising:

memory configured to store compiled application code, wherein the compiled application code comprises a first loop comprising a first plurality of chunks and a second loop comprising a second plurality of chunks, wherein the plurality of loops are in a sequence;

a plurality of threads configured to execute on a plurality of processors, the plurality of threads comprising a first thread and a second thread, wherein the first thread is configured to:

execute a first chunk of the first plurality of chunks;

set, based on completing execution of the first chunk, a synchronization variable after completing execution of the first chunk of the first plurality of chunks; and execute a first chunk of the second plurality of chunks after setting the synchronization variable; and wherein the second thread is configured to:

wait until the synchronization variable is set; and execute a second chunk of the first plurality of chunks based on the synchronization variable being set, wherein for each loop of the plurality of loops, the plurality of threads are assigned in round robin order to chunks of the loop for execution, wherein the plurality of threads are assigned in a same order for each of the plurality of loops.

11. The computer system of claim 10, wherein the second thread is further configured to:

reset the synchronization variable prior to executing the second chunk of the first plurality of chunks; and wherein the first thread is further configured to:

set, based on completing execution of the first chunk of the second plurality of chunks, the synchronization variable after completing execution of the first chunk of the second plurality of chunks.

12. The computer system of claim 11, wherein the second thread is further configured to configured to:

after resetting the synchronization variable, wait until the synchronization variable is set; and execute a second chunk of the second plurality of chunks based on the synchronization variable being set.

13. The computer system of claim 10, further comprising:

a compiler configured to execute on the plurality of processors and create the compiled application code by:

obtaining application source code stored in the memory;

calculating, from the application source code, a plurality of data dependencies in the first plurality of chunks and the second plurality of chunks;

inserting, into the first loop and prior to completing compilation, a precedent synchronization instruction for execution when execution of the first chunk of the first plurality of chunks completes, wherein the synchronization variable is set by executing the precedent synchronization instruction; and completing the compilation of the application source code to create an application compiled code.

14. A non-transitory computer readable medium comprising computer readable program code embodied therein for causing a computer system to perform a method for compiling application source code, the method comprising:
- selecting a plurality of loops for parallelization, wherein the plurality of loops comprises a first loop and a second loop, wherein the plurality of loops are in a sequence;
- partitioning the first loop into a first plurality of chunks;
- partitioning the second loop into a second plurality of chunks;
- calculating a plurality of data dependencies between the first plurality of chunks and the second plurality of chunks, wherein a first chunk of the second plurality of chunks is dependent on a first chunk of the first plurality of chunks;
- inserting, into the first loop and prior to completing compilation, a precedent synchronization instruction for execution when execution of the first chunk of the first plurality of chunks completes;
- completing compilation of the application source code to create an application compiled code; and
- for each loop of the plurality of loops, assigning, for execution, a plurality of threads in round robin order to chunks of the loop, wherein the plurality of threads are assigned in a same order for each of the plurality of loops.

15. The non-transitory computer readable medium of claim 14, wherein during execution of the application compiled code, the plurality of loops are concurrently executed by a plurality of threads, wherein concurrently executing the plurality of loops comprises executing a second chunk of the first plurality of chunks while executing the first chunk of the second plurality of chunks.

16. The non-transitory computer readable medium of claim 14, wherein the precedent synchronization instruction, when executed, sets a synchronization variable.

17. The non-transitory computer readable medium of claim 15, wherein a second chunk of the first plurality of chunks is dependent on the first chunk of the first plurality of chunks, and wherein the method further comprises:
- inserting, into the first loop, a dependent synchronization instruction for execution before execution of the first chunk of the first plurality of chunks,
- wherein the dependent synchronization instruction, when executed, waits for the synchronization variable to be set.

18. The non-transitory computer readable medium of claim 15, wherein the method further comprises:
- inserting, into the second loop, a dependent synchronization instruction for execution before execution of the first chunk of the second plurality of chunks completes,
- wherein the dependent synchronization instruction, when executed, waits for the synchronization variable to be set.

19. The non-transitory computer readable medium of claim 15, wherein partitioning the first loop into the first plurality of chunks comprises:
- obtaining a synchronization time to synchronize based on a time for the thread to access the synchronization variable;
- obtaining a synchronization multiplier; and
- calculating the chunk size by multiplying the synchronization time by the synchronization multiplier to obtain a first result,
- wherein each of the first plurality of chunks is of the chunk size.

20. The non-transitory computer readable medium of claim 18, wherein partitioning the first loop into the first plurality of chunks further comprises:
- calculating an estimated execution time for executing an iteration of each loop of the plurality of loops;
- generating a combined estimated execution time value by mathematically combining the estimated execution time for executing the iteration of each loop of the plurality of loops; and
- dividing the first result by the combined estimated execution time value to obtain a second result,
- wherein the second result is the chunk size.

* * * * *

UNITED STATES PATENT AND TRADEMARK OFFICE
CERTIFICATE OF CORRECTION

PATENT NO. : 8,479,185 B2
APPLICATION NO. : 12/963786
DATED : July 2, 2013
INVENTOR(S) : Kalogeropulos et al.

It is certified that error appears in the above-identified patent and that said Letters Patent is hereby corrected as shown below:

In the Claims:

In column 20, line 48, in Claim 12, delete "configured to configured to:" and insert -- configured to: --, therefor.

Signed and Sealed this
Fifteenth Day of October, 2013

Teresa Stanek Rea
*Deputy Director of the United States Patent and Trademark Office*